United States Patent
Noll et al.

[15] 3,672,030
[45] June 27, 1972

[54] DOWNCOILER MANDREL OF THE TOGGLE LINK TYPE FOR HOT STRIP MILLS, AND METHODS FOR REPAIRING OR REBUILDING SAME

[72] Inventors: Stanley Darwin Noll, Shaker Heights; William F. Delfeld, Lyndhurst, both of Ohio

[73] Assignee: Production Experts, Inc., Cleveland, Ohio

[22] Filed: March 9, 1970

[21] Appl. No.: 17,828

[52] U.S. Cl. ..........................................29/401, 29/149.5 NM
[51] Int. Cl. ....................................B22d 19/10, B21d 53/10
[58] Field of Search ..........................29/401, 423, 149.5 NM

[56] References Cited

UNITED STATES PATENTS 1,444,628  2/1923  Miller ........................................29/401
2,958,927  11/1960  Kravats .............................29/149.5 NM Primary Examiner—Charles W. Lanham
Assistant Examiner—R. M. Rogers
Attorney—Isler and Ornstein

[57] ABSTRACT

A method of repairing a downcoiler mandrel is described, in which worn areas of the mandrel body and segments are machined to dimensions suitable for accommodating bushings and half-bushings of pre-selected materials, the toggle links are machined in their pin areas to receive bushings of selected materials, and the outer arcuate surfaces of the links are plated with a hard wear-resistant metal, such as chromium. The overall construction resulting from such repairs and replacements is also applicable to the construction of new mandrels of this type.

6 Claims, 10 Drawing Figures

INVENTORS
STANLEY DARWIN NOLL
BY WILLIAM F. DELFELD

*Isler & Ornstein*

ATTORNEYS

INVENTORS
STANLEY DARWIN NOLL
BY WILLIAM F. DELFELD

*Isler & Ornstein*
ATTORNEYS

INVENTORS
STANLEY DARWIN NOLL
BY WILLIAM F. DELFELD

*Isler & Ornstein*

ATTORNEYS

INVENTORS
STANLEY DARWIN NOLL
BY WILLIAM F. DELFELD

*Isler & Ornstein*
ATTORNEYS

DOWNCOILER MANDREL OF THE TOGGLE LINK TYPE FOR HOT STRIP MILLS, AND METHODS FOR REPAIRING OR REBUILDING SAME

The invention is directed primarily to the repair and reconstruction of worn downcoiler mandrels of the type in which toggle links are employed to interconnect the mandrel body with surface segments of the mandrel and in which the links are activated to expand and contract the mandrel.

The invention will be best understood by reference to the accompanying drawings, forming a part of this application, and in which FIG. 1 is a fragmentary longitudinal cross-sectional view of a typical or conventional downcoiler mandrel of the type which utilizes toggle links for expanding the segments, and with the mandrel in expanded condition;

Figure 1:
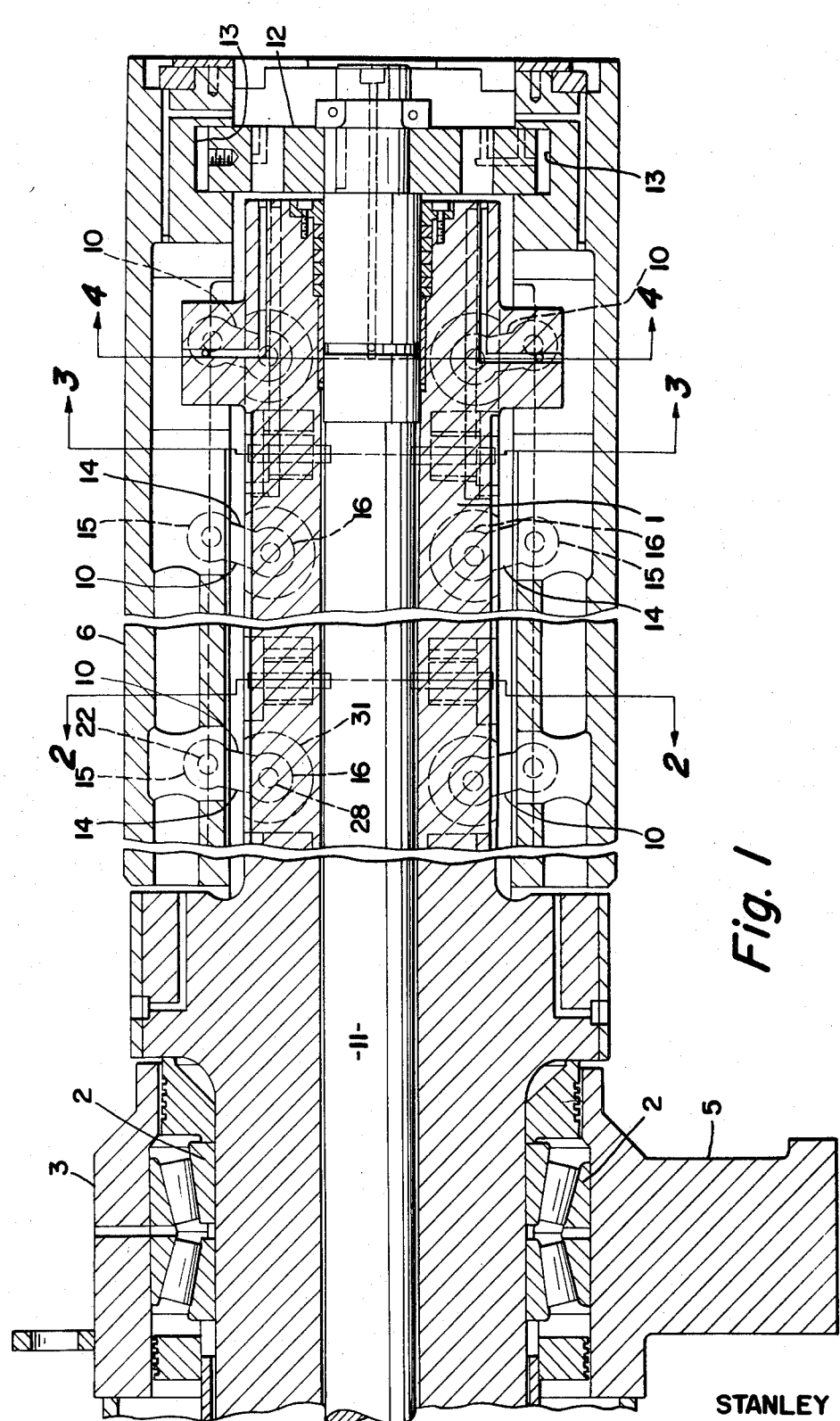
Figure 2:
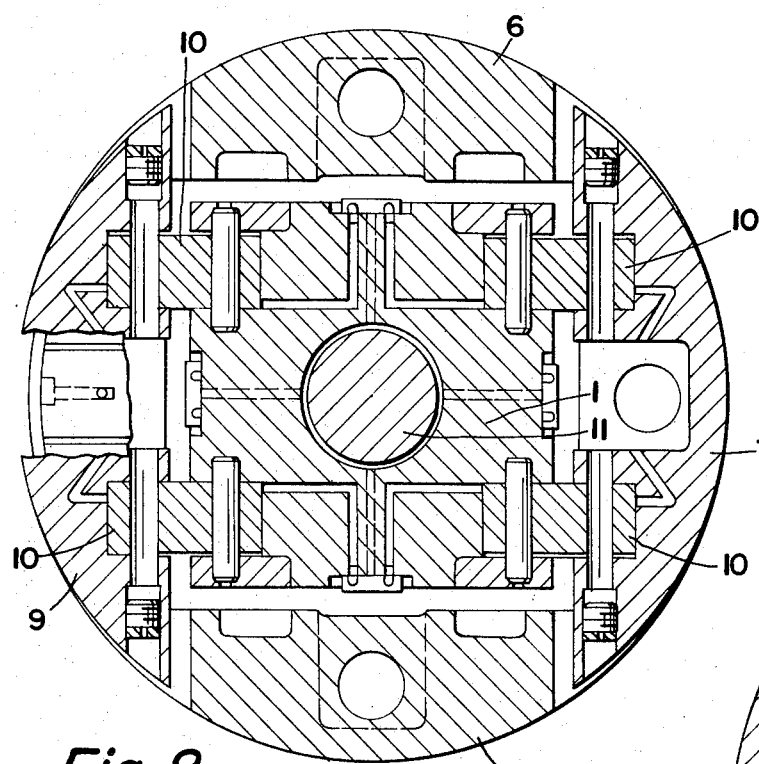
FIG. 2 is a vertical or transverse cross-sectional view, taken on the line 2—2 of FIG. 1.
Figure 3:
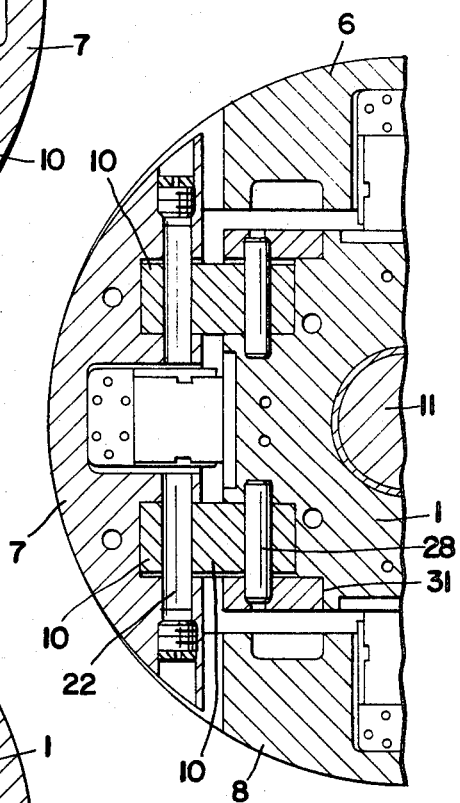
FIG. 3 is a fragmentary vertical or transverse cross-sectional view, taken on the line 3—3 of FIG. 1.
Figure 4:
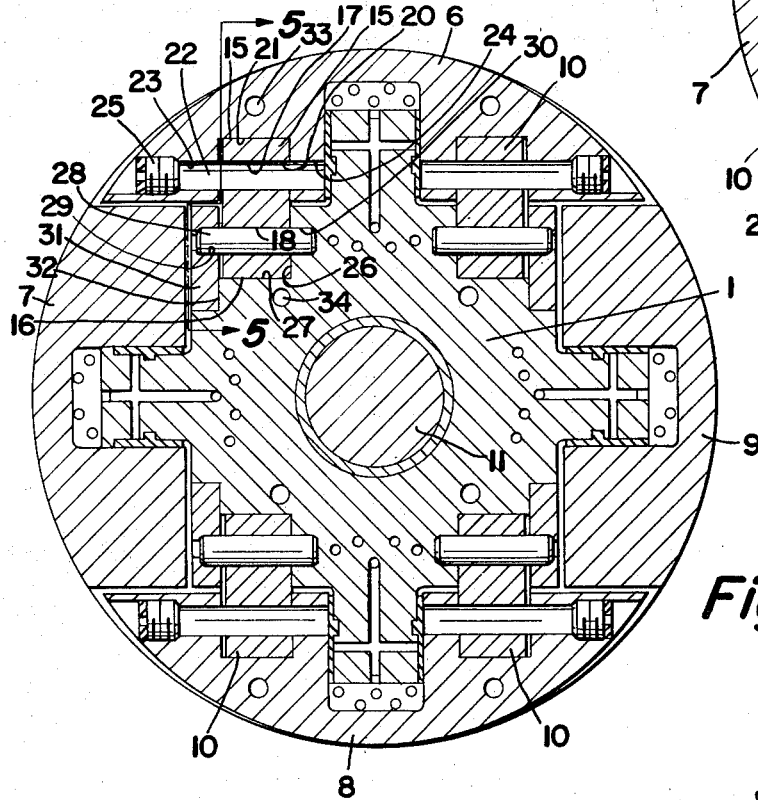
FIG. 4 is a vertical or transverse cross-sectional view, taken on the line 4—4 of FIG. 1, but with the mandrel in collapsed condition.

Referring more particularly to FIGS. 1 to 5 inclusive of the drawings, the downcoiler mandrel is seen to comprise a mandrel body 1 of the general cross-sectional configuration shown in FIGS. 2, 3 and 4, and mounted for rotation in bearings 2, which, in turn, are mounted within a stationary cylindrical housing 3, supported by a pedestal or base 5.

The mandrel further comprises four segments 6, 7, 8 and 9, which surround the mandrel body 1 and are of substantially similar construction, the outer surfaces of these segments constituting, in effect, a substantially continuous cylindrical surface, on which hot strip received from a strip mill is continuously wound or reeled to provide a coil of such strip, which is subsequently removed from the mandrel.

The strip is wound on the mandrel while the mandrel segments are in their expanded condition or position, as shown in FIGS. 2 and 3, but in order to facilitate removal of the coil of strip from the mandrel, the mandrel segments must be collapsed to the position or condition shown in FIG. 4.

For the purpose of effecting expansion and collapsing movement of the mandrel segments, rows of toggle links 10 are provided, which pivotally interconnect the mandrel segments with the mandrel body, the links in each row being uniformly spaced longitudinally from each other, and also arranged in parallelism with each other, as best shown in FIG. 1.

The segments, as previously stated in connection with FIG. 1, are in their expanded condition, so that in order to move the segments to their collapsed position, as shown in FIG. 4, it is necessary to move the segments from the position shown in FIG. 1 to the right until the segments occupy the position shown in FIG. 4. This collapsing movement is effected by a rocking movement of the outer portions of all of the toggle links 10 toward the right, from the position shown in FIG. 1.

This movement of the segments to the right is effected by means of a shaft 11, which extends through the center of the mandrel body 1, and has keyed to one end thereof an actuator or disc 12, the peripheral portion of which extends into recesses 13 adjacent the ends of the mandrel segments. Thus, when the shaft 11 is moved toward the right from the position shown in FIG. 1, the segments are simultaneously moved to the right by the disc 12. At the same time, the segments slide over the front and rear surfaces of the disc 12, so that the axial movement of the disc for the purpose of collapsing or expanding the segments can be effected without interfering with the rotation of the mandrel body and segments.

Figure 5:
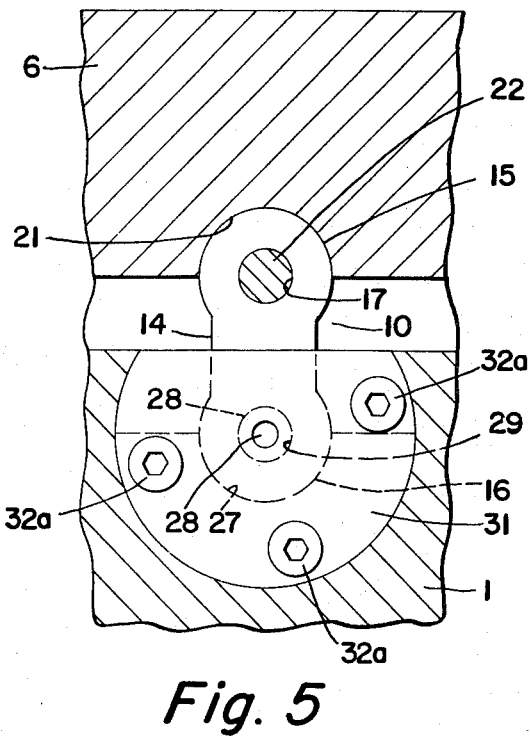
FIG. 5 is a fragmentary cross-sectional view, taken on the line 5—5 of FIG. 4.
Figure 6:
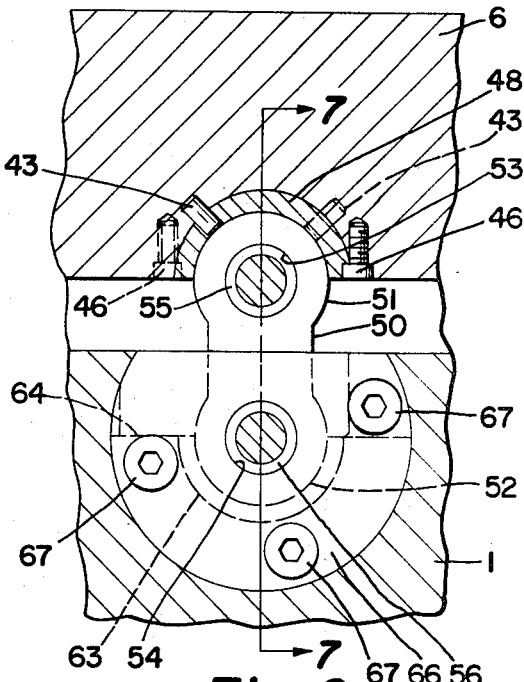
FIG. 6 is a fragmentary cross-sectional view, similar to FIG. 5, but showing a construction of the link and associated parts, embodying the invention.

Referring more particularly to FIGS. 1, 4 and 5, the toggle links 10 are of flat "dog bone" shape, having a central body portion 14 and end portions 15 and 16 of cylindrical shape, the portion 15 having a central or axial opening 17, and the portion 16 having a central or axial opening 18.

The end portion 15 of each link is mounted or seated for pivotal movement in a pocket or recess 20 in the segment, which recess has an arcuate bottom 21 conforming to the outer surface of the portion 15 of the link.

The end portion 15 of the link 10 is mounted for pivotal movement about a steel pin 22, which extends through the axial opening 17 of the link, and the ends of which are mounted in aligned openings 23 and 24 in the segment, which openings are of the same diameter as the opening 17. The pin 22 has a threaded head 25, which is threaded into the segment, so that the pin 22 can be removed, when necessary.

The end portion 16 of the link 10 is mounted or seated for pivotal movement in a pocket or recess 26 in the mandrel body 1, which recess has an arcuate bottom 27 conforming to the outer surface of the end portion 16.

The end portion 16 of the link 10 is mounted for pivotal movement about a steel pin 28, which extends through the axial opening 18 of the link, and the ends of which are mounted in aligned openings 29 and 30 in the mandrel body, which openings are of the same diameter as the opening 18. The pin 28 is retained against axial displacement by means of a retainer plate 31, disposed in a recess 32 of the mandrel body, and secured to the mandrel body by means of hollow head screws 32a.

The peripheral contour of this plate 31 is indicated in broken lines in FIG. 1 and in solid lines in FIG. 5. The pin 28 may be removed by first removing the plate 31.

Passageways 33 and 34 in the segment and mandrel body respectively, are provided, as shown in FIG. 4, for admitting an oil lubricant or the like to the ends of the link 10, to reduce wear of these parts as well as the parts of the segment and mandrel adjacent the link. Some of this lubrication also reaches the pins 22 and 28.

Due to the metal to metal contact of the links 10 with the mandrel body and segments, as well as the metal to metal contact of the pins 22 and 28 with the links and the mandrel body and segments, continued use of the mandrel causes rapid wear of the links, the surfaces against which they bear, the pins, and the surfaces against which the pins bear, necessitating frequent replacement of links and pins, as well as repair of the worn surfaces of the mandrel body and segments. This repair is usually accomplished through the use of welding overlays, followed by machining or removal of excess overlay and subsequent heat treatment to relieve stresses developed during the welding.

This stress-relieving process frequently causes distortion of the mandrel body, as to its axial straightness, and this distortion, in turn, adversely affects the life of the bearings 2 in which the mandrel body rotates.

The lubrication to which reference has been made is accomplished through the use of various petroleum products, such lubrication procedure not only requiring the use of personnel for performing the lubrication, but also resulting in frequent malfunctioning caused by improper lubrication, due either to insufficient frequency of lubrication, or to improper distribution of the lubricant within the mandrel body and segments.

The foregoing replacements and repairs, and malfunctions due to improper lubrication, require frequent shut-downs of the mill, disassembly of the mandrel, reassembly, etc., all of which is time-consuming as well as expensive.

The present invention has, as its primary object, a novel method of repairing mandrels of the character described, which not only greatly reduces or virtually eliminates wear of the mandrel body, segments, links and pins, but also obviates the need for use of welding overlays and removal of excess overlay, as well as the subsequent heat treatment and resulting distortion or deformation of the mandrel body.

Another object of the invention is to provide a repair method of the character described, involving the use of bushings and half-bushings or inserts of pre-selected materials, for interposition between the toggle links and mandrel body and segments, and between the toggle pins and links and mandrel body and segments, such that wear of the character hereinbefore described, as well as the need for frequent replacement and repair, is obviated or reduced to a minimum.

A further object of the invention is to provide for the use of bushings and half-bushings or inserts of the character described, and for the purposes stated, made of pre-selected materials, such that little or no lubrication is required for facilitating movement of the toggle links, or, if some lubrication is required, the lubrication can be effected in a uniform manner, at infrequent intervals, and without causing malfunctioning arising from normal lubrication procedures.

A further object of the invention is to provide a mandrel construction, particularly with reference to the toggle links and associated parts, which is applicable to the manufacture of new mandrels, in addition to the repair of old, worn or used mandrels.

A still further object of the invention is to provide toggle links of the character described, having wear surfaces which are electroplated at selected areas thereof with materials which are conducive to easier sliding movement of the toggle links and which tend to reduce the wear of and preserve the life of the links.

These, as well as other objects, are accomplished in the manner which is best shown in FIGS. 6 to 10 inclusive of the drawings.

On the assumption that wear of the mandrel shown and described with reference to FIGS. 1 to 5 inclusive, has occurred, to an extent requiring repair or rehabilitation of the areas of the mandrel in and adjacent the toggle links and their connections to the mandrel body and segments, the mandrel is disassembled, and repairs made in a manner to be now described.

The recess 20 in the mandrel segment is enlarged by a boring operation to a diameter such that it can accommodate a half-bushing or insert to be presently described. This is illustrated in FIGS. 6 to 10, where it is shown that holes or openings 40 and 41 are provided in the mandrel segment for the reception of dowel pins 43, and threaded holes 44 and 45 are also provided for the reception of hollow head cap screws 46, the openings 44 and 45 being counterbored at their upper ends, as at 47, to provide space for the heads of such screws.

An insert or half-bushing 48 is then placed within the enlarged recess 20, and is locked against endwise displacement by means of the dowel pins 43 which extend through the half-bushing and into the holes 40 and 41, and locked to the segment by means of the cap screws 46 secured in the threaded holes 44 and and 45 and the caps of which are disposed in the counterbores 47 and bear against shoulders 49 on the half-bushing.

The half-bushing or insert 48 is preferably made of bronze or other non-ferrous metal having hardness and wear properties similar to bronze, although, in some cases, a ferritic material, such, for example, as Ferro-Tic, which is a powder metal composite of hard titanium grains cemented by an alloy tool steel matrix, may be employed for making the insert. The general or generic term "metallic" will be used hereinafter to encompass such materials, and to distinguish them from certain parts made of non-metallic materials, to which reference will presently be made.

The half-bushing or insert 48 is of a thickness, for example, three-eighths inch, such as to substantially fill the space between the enlarged recess 20 and the end of a toggle link of conventional size or dimensions.

New toggle links 50 are provided having their arcuate end surface portions 51 and 52 electroplated with chromium, to provide hard, wear-resistant surfaces.

The portions of the links 50 corresponding to the end portions 15 and 16, which have previously been described, are provided with central or axial openings 53 and 54, corresponding respectively to the previously described openings 17 and 18, but of enlarged diameter, so as to accommodate bushings 55 and 56. The bushing 55 is preferably made of the same material as the half-bushing or insert 48.

The openings 23 and 24 in the segment (see FIG. 4) are enlarged to the same diameter as the opening 53, to accommodate bushings 57 and 58, preferably made of the same material as the bushing 55 and the half-bushing or insert 48.

Figure 7:
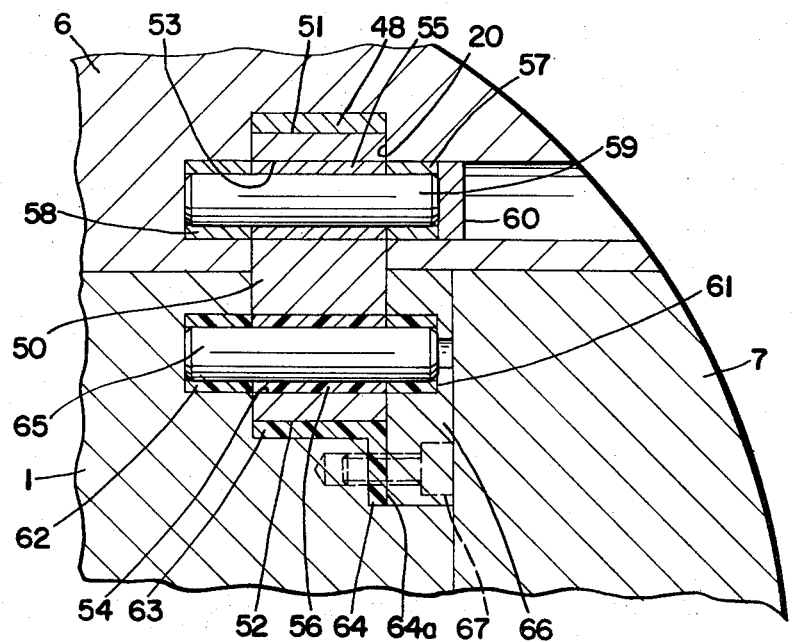
FIG. 7 is a fragmentary cross-sectional view, taken on the line 7—7 of FIG. 6.
Figure 8:
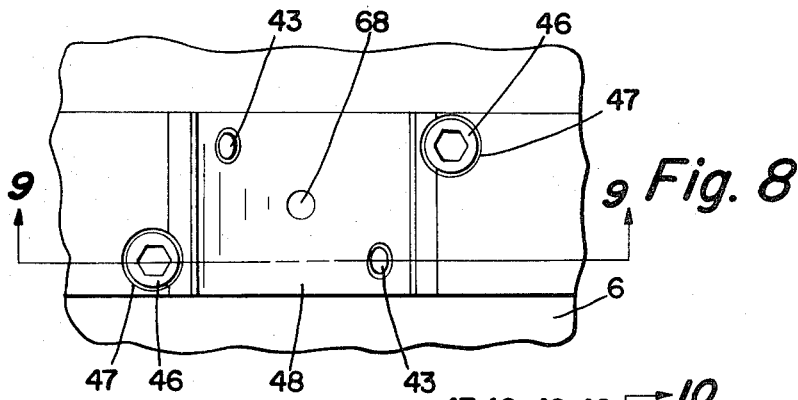
FIG. 8 is a plan view showing the manner in which the mandrel segment half bushing or insert is held in position in the mandrel segment.
Figure 9:
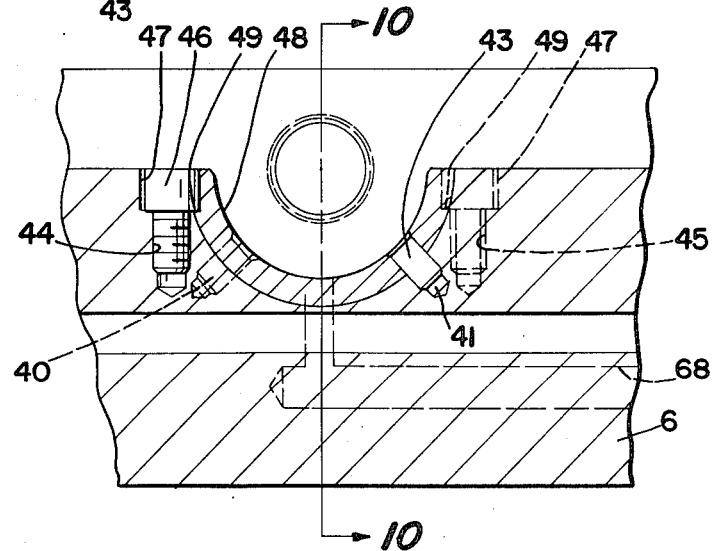
FIG. 9 is a fragmentary cross-sectional view, taken on the line 9—9 of FIG. 8.
Figure 10:
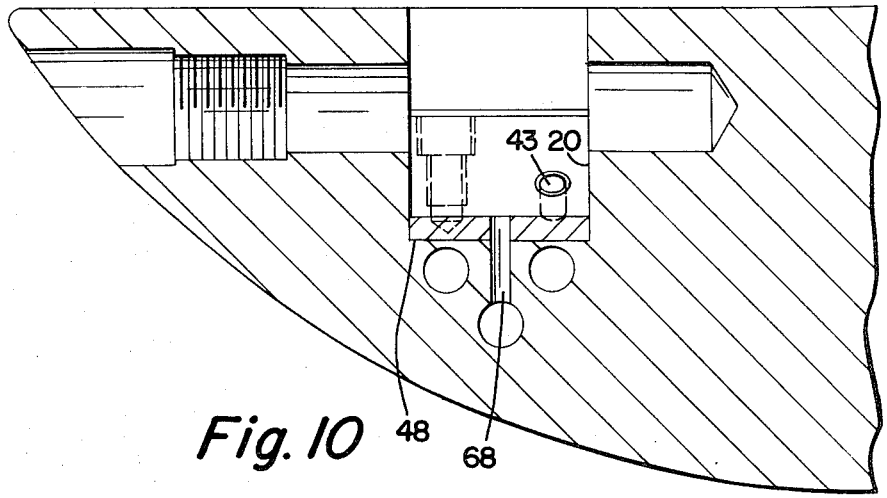
FIG. 10 is a fragmentary cross-sectional view, taken on the line 10—10 of FIG. 9.

A steel pin 59 corresponding to the pin 22 is then inserted through the bushings 55, 57 and 58, and may be held in place by a plug 60, as shown in FIG. 7, which also holds the bushings in place.

The bushing 56 is preferably made of a non-metallic material, such, for example, as Nylon or other synthetic resin or plastic having properties similar to Nylon, as, for example, certain grades of Teflon. In some case, a metallic material impregnated with such synthetic resin or plastic may be employed, or such a resin or plastic impregnated with metallic particles may be employed for making such bushing, as long as such material has hardness and wear properties similar to those of Nylon. The general or generic term "non-metallic" will be used hereinafter to encompass such materials, and to distinguish them from the materials of which the parts 48, 55, 57 and 58 are made.

The openings 29 and 30 in the mandrel body (see FIG. 4) are enlarged to the same diameter as the opening 54, to accommodate bushings 61 and 62, which are made of the same material as the bushing 56.

The recess 26 in the mandrel body is enlarged by a boring operation to a diameter such that it can accommodate a half-bushing or insert 63, made of the same material as the bushings 56, 61 and 62, and provided with a semi-circular end flange 64, the outer surface 64a of which is substantially flush with the outer end surface of the link 50.

A steel pin 65, corresponding to the pin 28, is then inserted through the bushings 61, 56 and 62, and the pin, the bushings, half-bushing and link are then secured in position, or against displacement, as by means of a plate 66, which is secured to the mandrel body 1 by means of hollow headed cap screws 67.

Provision may also be made for lubricating the toggle links and adjacent areas, through passageways 68 (see FIGS. 8, 9 and 10) in the mandrel segments, and similar provisions may be made in the mandrel body for lubricating those portions of the links which are disposed in the mandrel body.

By repairing the mandrel in this manner, not only is wear of the critical parts and areas which have been described, greatly reduced or virtually eliminated, but the need for use of welding overlays and removal of excess overlay, as well as the subsequent heat treatment and resulting distortion or deformation of the mandrel body, is obviated.

The use of bushings and half-bushings or inserts of the selected materials, which have been described, greatly reduces wear, as well as the need for frequent replacement and repair, and the need for excessive lubrication. Moreover, these materials, being softer than the material of the mandrel body, mandrel segments, and linkage pins, absorb shocks, and, to some extent, become slightly deformed during use. However, this deformation of the bushings, etc., rather than other parts of the mandrel, eliminates the need for machining portions of the mandrel and segments, when the bushings and half-bushings are to be replaced.

The toggle links are produced from an alloy steel, heat treated and hardened to insure extended life of the links by confining the wear to the areas in which the bushings are mounted, and to the plated areas which can be worked without difficulty at the time of rebuilding. Where new toggle links are employed, these may be provided with built-in bushings at the pin-receiving openings or areas.

Although the invention has been described more particularly with reference to a method or methods of repairing or rehabilitating mandrels which have been in use, it will be readily understood that the invention is also applicable to the construction of new mandrels, or to the replacement of old and worn mandrels by new mandrels incorporating the construction which has been described.

Moreover, although the insert or half-bushing 48, and bushings 55, 57 and 58 in the mandrel segment have been described as made of selected "metallic" materials, it is to be understood that under certain conditions, it may be desirable to make these of materials hereinbefore referred to or described generally or generically as "non-metallic" materials, and the use of such non-metallic materials for such inserts or half-bushings and bushings is deemed to fall within the scope of this invention.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. A method of repairing toggle link connections between the body and a segment of a downcoiler mandrel, wherein said link is pivotally moveable about pins and within semi-cylindrical pockets provided in said body and said segment comprising the steps of disassembling said structure by removal of said pins followed by removal of said links from said pockets; thereafter enlarging said pockets to accommodate semi-cylindrical inserts seated therein and of a configuration so as to receive the ends of the links; thereafter machining the areas adjacent said pockets to receive means for retaining said inserts immobile within said pockets, said machining step including the further step of drilling said segment to provide at least one radial bore extending from said pocket and at least one tangential bore adjacent a marginal edge of said pocket for receipt of a fastener means to render said insert immobile in said pocket; thereafter inserting semi-cylindrical inserts in said enlarged pockets; fastening said insert in the segment pocket to render same immobile therein; installing the ends of the link in said pocketed inserts, installing said pins in the ends of said link while fastening the insert in said body to render same immobile in the pocket in said body and finally anchoring said pin in said segment to prevent axial movement thereof.

2. The method as defined in claim 1, wherein said method includes further the steps of refurbishing said links by enlarging the pin receiving holes in the ends thereof and thereafter installing cylindrical inserts in said enlarged holes prior to installation of said link in said pocketed inserts.

3. The method as defined in claim 1 including the further step of providing a chromium wear resistant surface on the ends of said link.

4. The method as defined in claim 1 wherein said body insert is formed of a non-metallic material.

5. The method as defined in claim 1 wherein said insert in said segment is formed of metallic material.

6. The method as defined in claim 1 wherein the step of machining adjacent said pockets includes the machining of said body to provide a semi-circular counterbore at the end of said semi-cylindrical pocket in said body to receive a locking means to immobilize said insert in said pocket.

* * * * *